United States Patent
Roberts et al.

(10) Patent No.: US 9,021,404 B2
(45) Date of Patent: Apr. 28, 2015

(54) SYSTEMS AND METHODS FOR MODIFYING CONTENT BASED ON A POSITIONAL RELATIONSHIP

(75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1620 days.

(21) Appl. No.: 11/510,386

(22) Filed: Aug. 25, 2006

(65) Prior Publication Data
US 2008/0052624 A1     Feb. 28, 2008

(51) Int. Cl.
| | |
|---|---|
| G06F 3/00 | (2006.01) |
| H04N 5/44 | (2011.01) |
| H04N 7/16 | (2011.01) |
| H04N 21/422 | (2011.01) |
| H04N 21/4363 | (2011.01) |
| H04N 21/439 | (2011.01) |
| H04N 21/4402 | (2011.01) |
| H04N 21/442 | (2011.01) |
| H04N 21/45 | (2011.01) |

(52) U.S. Cl.
CPC ............. *H04N 5/4403* (2013.01); *H04N 7/163* (2013.01); *H04N 21/422* (2013.01); *H04N 21/43637* (2013.01); *H04N 21/439* (2013.01); *H04N 21/4402* (2013.01); *H04N 21/44213* (2013.01); *H04N 21/4508* (2013.01); *H04N 21/4532* (2013.01); *H04N 2005/4428* (2013.01)

(58) Field of Classification Search
USPC ........................................................ 715/866
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,488,434 A | 1/1996 | Jung |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |

(Continued)

Primary Examiner — Anil N Kumar

(57) ABSTRACT

In one of many possible embodiments, a system includes a content processing subsystem and a user device communicatively coupled to the content processing subsystem. The content processing subsystem is configured to provide content for experiencing by a user, the content processing subsystem being further configured to modify at least one element of the content based on a positional relationship between the content processing subsystem and the user device.

23 Claims, 10 Drawing Sheets

(56) References Cited

U.S. PATENT DOCUMENTS

| | | |
|---|---|---|
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |
| 5,828,945 A | 10/1998 | Klosterman |
| 5,870,150 A | 2/1999 | Yuen |
| 5,886,746 A | 3/1999 | Yuen et al. |
| 5,915,026 A | 6/1999 | Mankovitz |
| 5,923,362 A | 7/1999 | Klosterman |
| 5,940,073 A | 8/1999 | Klosterman et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,988,078 A | 11/1999 | Levine |
| 5,991,498 A | 11/1999 | Young |
| 6,002,394 A | 12/1999 | Schein et al. |
| 6,016,141 A | 1/2000 | Knudson et al. |
| 6,028,599 A | 2/2000 | Yuen et al. |
| 6,049,652 A | 4/2000 | Yuen et al. |
| 6,052,145 A | 4/2000 | Macrae et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,118,492 A | 9/2000 | Milnes et al. |
| 6,133,909 A | 10/2000 | Schein et al. |
| 6,137,950 A | 10/2000 | Yuen |
| 6,144,401 A | 11/2000 | Casement et al. |
| 6,151,059 A | 11/2000 | Schein et al. |
| 6,167,188 A | 12/2000 | Young et al. |
| 6,177,931 B1 | 1/2001 | Alexander et al. |
| 6,216,265 B1 | 4/2001 | Roop et al. |
| 6,239,794 B1 | 5/2001 | Yuen et al. |
| 6,247,176 B1 | 6/2001 | Schein et al. |
| 6,262,722 B1 | 7/2001 | Allison et al. |
| 6,263,501 B1 | 7/2001 | Schein et al. |
| 6,323,911 B1 | 11/2001 | Schein et al. |
| 6,341,195 B1 | 1/2002 | Mankovitz et al. |
| 6,341,374 B2 | 1/2002 | Schein et al. |
| 6,388,714 B1 | 5/2002 | Schein et al. |
| 6,396,546 B1 | 5/2002 | Alten et al. |
| 6,412,110 B1 | 6/2002 | Schein et al. |
| 6,430,358 B1 | 8/2002 | Yuen et al. |
| 6,430,359 B1 | 8/2002 | Yuen et al. |
| 6,453,471 B1 | 9/2002 | Klosterman |
| 6,460,181 B1 | 10/2002 | Donnelly |
| 6,466,734 B2 | 10/2002 | Yuen et al. |
| 6,469,753 B1 | 10/2002 | Klosterman et al. |
| 6,477,705 B1 | 11/2002 | Yuen et al. |
| 6,498,895 B2 | 12/2002 | Young et al. |
| 6,505,348 B1 | 1/2003 | Knowles et al. |
| 6,538,701 B1 | 3/2003 | Yuen |
| 6,549,719 B2 | 4/2003 | Mankovitz |
| 6,564,379 B1 | 5/2003 | Knudson et al. |
| 6,567,606 B2 | 5/2003 | Milnes et al. |
| 6,588,013 B1 | 7/2003 | Lumley et al. |
| 6,625,503 B1 * | 9/2003 | Smith ............................. 700/83 |
| 6,668,133 B2 | 12/2003 | Yuen et al. |
| 6,687,906 B1 | 2/2004 | Yuen et al. |
| 6,732,369 B1 | 5/2004 | Schein et al. |
| 6,742,183 B1 | 5/2004 | Reynolds et al. |
| 6,745,391 B1 | 6/2004 | Macrae et al. |
| 6,756,997 B1 | 6/2004 | Ward et al. |
| 6,760,537 B2 | 7/2004 | Mankovitz |
| 6,799,326 B2 | 9/2004 | Boylan et al. |
| 6,799,327 B1 | 9/2004 | Reynolds et al. |
| 6,850,693 B2 | 2/2005 | Young et al. |
| 6,859,799 B1 | 2/2005 | Yuen |
| 6,971,072 B1 * | 11/2005 | Stein ............................ 715/866 |
| 7,039,935 B2 | 5/2006 | Knudson et al. |
| 7,069,576 B1 | 6/2006 | Knudson et al. |
| 7,487,529 B1 | 2/2009 | Orlick |
| 2001/0029610 A1 | 10/2001 | Corvin et al. |
| 2001/0047298 A1 | 11/2001 | Moore et al. |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0229200 A1 * | 10/2005 | Kirkland et al. ................ 725/12 |
| 2005/0251824 A1 | 11/2005 | Thomas et al. |
| 2006/0050892 A1 * | 3/2006 | Song et al. ...................... 381/59 |
| 2006/0093998 A1 * | 5/2006 | Vertegaal ....................... 434/236 |
| 2006/0156336 A1 | 7/2006 | Knudson et al. |
| 2006/0212894 A1 | 9/2006 | Knudson et al. |
| 2006/0253874 A1 * | 11/2006 | Stark et al. ..................... 725/62 |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0089057 A1 * | 4/2007 | Kindig ........................... 715/716 |
| 2007/0107010 A1 | 5/2007 | Jolna et al. |
| 2008/0218641 A1 * | 9/2008 | Kjeldsen et al. .............. 348/746 |

* cited by examiner

|  | 8:30 | 9:00 | 9:30 |
|---|---|---|---|
| 38 | So You Think... | So You Think You Can Dance | |
| 39 | WNBA Basketball | | Box-ing |
| 40 | Law and Order | Law and Order | |

SYSTEMS AND METHODS FOR MODIFYING CONTENT BASED ON A POSITIONAL RELATIONSHIP

BACKGROUND INFORMATION

The advent of computers, interactive electronic communication, the Internet, and other advances in the digital realm of consumer electronics have resulted in a great variety of programming, recording, and viewing options for users who wish to view or otherwise experience content, including media content such as television programs. Many different types of electronic devices are able to present content for experiencing by users. For example, the set-top-box (STB) has become an important computing device for accessing media content. A common configuration includes an STB accessing and providing media content to an output device such as a television for presentation to a user.

A conventional STB or other computing device typically provides content for presentation in accordance with predetermined settings, without taking into account changes to the presentation environment. For example, visual content is typically displayed on a screen in accordance with default settings (e.g., size and resolution), regardless of the position of a user in relation to the screen. Although this may be satisfactory for a user who remains in one place while content is presented, such stationary users are becoming less common. Many users prefer to multitask while experiencing content, meaning that they divide their attention between several different tasks while content is being presented. Consequently, it is not uncommon for a user to move around (i.e., change locations) in relation to a device that is providing content.

Conventional content processing devices do not take into account their positional relationships with users. In other words, content provided by a standard device is typically presented in accordance with preset settings and is not adjusted when a user changes his position relative to the device. Unfortunately, the content may not be intelligible or accessible to a user at certain distances or angles from the device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 7 illustrates the exemplary viewing screen and program guide of FIG. 6 with the display of the program guide having been modified based on a positional relationship, according to an embodiment.

DETAILED DESCRIPTION OF PREFERRED EMBODIMENTS

I. Introduction

Figure 1:
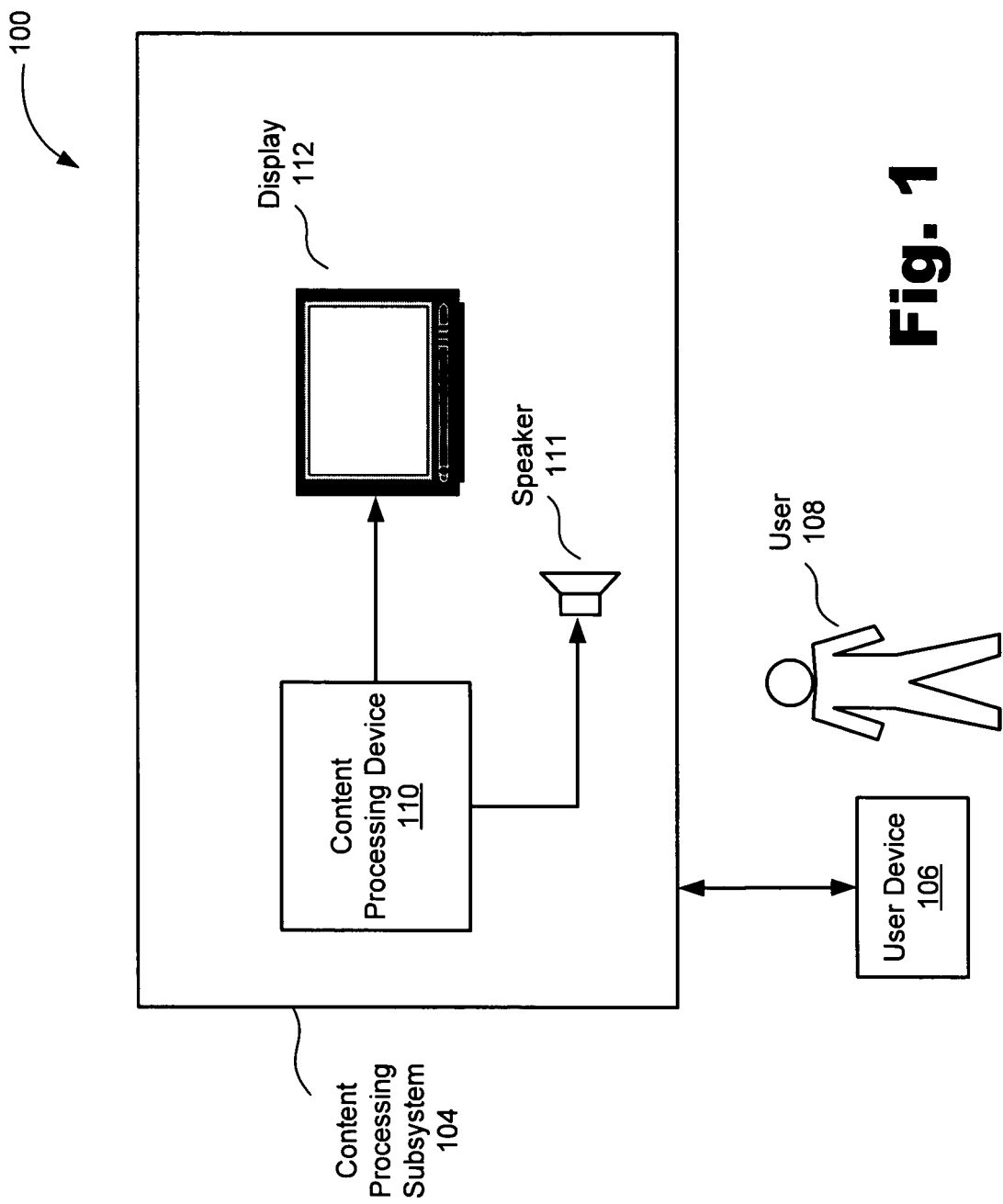
FIG. 1 illustrates an example of a system for modifying content based on a positional relationship, according to an embodiment.

Exemplary systems and methods for modifying content based on a positional relationship are described herein. As used herein, the terms "content" and "content instance" will be used to refer generally to any electronically represented content, including, but not limited to, any television program, on-demand program, pay-per-view program, broadcast media program, commercial, advertisement, video, movie, song, photograph, image, audio, text, user interface, program guide, any component or combination thereof, or any other form of electronically represented content that may be viewed or otherwise experienced by a user.

As used herein, the term "positional relationship" will be used to refer generally to any relationship between the physical dispositions (e.g., locations) of two or more objects, including, but not limited to, distance, angle, direction, orientation, or other physical relationship between the objects.

The exemplary systems and methods described herein may modify content, or at least one element of the content based on a positional relationship between a user device and a content processing subsystem. For example, a content instance (or component thereof) may be scaled in size (e.g., enlarged or reduced) based on a distance between the user device and the content processing subsystem.

The positional relationship between the user device and the content processing subsystem typically approximates the positional relationship between a user and a presentation of content (e.g., a display of visual content or a broadcast of audio content). For example, the user device may include a remote control device that is typically located proximate to a user experiencing the content being provided by the content processing subsystem. The content processing subsystem may include a set-top box that is typically located proximate to the presentation (e.g., display) of content. Accordingly, the content, or a component thereof, may be modified based on an approximated positional relationship between the user and the presentation of the content. For example, displayed content may be enlarged in size (or the volume of audio content may be increased) when the distance between the user device and the content processing device increases, and displayed content may be reduced in size (or the volume of audio content may be decreased) when the distance between the user device and the content processing device decreases.

By modifying at least a component of a content instance based on an approximated positional relationship between the user and the presentation of the content, content provided for experiencing by the user may be tailored in a manner that generally enhances the experience of the user. For example, content may be modified such that it is more intelligible than unmodified content from certain distances or viewing angles.

Components and functions of exemplary embodiments of content modification systems and methods will now be described in more detail.

II. Exemplary System View

FIG. 1 illustrates an example of a system 100 for modifying content based on a positional relationship, according to one embodiment. Such systems 100 may take many different forms and include multiple and/or alternate components and facilities.

As shown in FIG. 1, system 100 may include a content processing subsystem 104 and a user device 106 communicatively coupled to one another. Content processing subsystem 104 may be configured to provide content for experiencing by a user 108. For example, content processing subsystem 104 may include a content processing device 110 configured to provide content, or elements of content, to speaker 111 and/or display 112 for presentation to the user 108.

The user 108 may be physically proximate to the user device 106, and a positional relationship between the user 108 and the content processing subsystem 104 may be approximated by determining a positional relationship between the user device 106 and the content processing subsystem 104. The content processing subsystem 104 may be configured to modify content, or at least one element of the content, based on the positional relationship. For example, content to be displayed may be scaled in size based on a determined distance between the content processing subsystem 104 and the user device 106.

In certain embodiments, system 100 may include any computer hardware and/or instructions (e.g., software programs), or combinations of software and hardware, configured to perform the processes described herein. In particular, it should be understood that the content processing subsystem 104 of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of the Microsoft Windows® operating system, the Unix operating system, Macintosh® operating system, and the Linux operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The exemplary components illustrated in FIG. 1 are not intended to be limiting. Indeed, additional or alternative components and/or implementations may be used, as is well known. The components of system 100 will now be described in additional detail.

A. Content Processing Subsystem

The content processing subsystem 104 may include one or more devices or components configured to access, provide, and modify content. For example, content processing device 110 may be configured to access content, including content (e.g., media and/or informative content) provided by a content provider over a network, or from any other suitable source, including any acceptable internal or external computer-readable medium on which content is stored or transmitted. In certain embodiments, content processing device 110 is configured to access media content and/or other forms of content provided by one or more content servers.

Content processing subsystem 104 may provide content for experiencing by the user 108. FIG. 1 illustrates exemplary output components of the content processing subsystem 104 that may be used to present content to the user 108. The output components may include audio speaker 111, display 112, or any other suitable output device(s) configured to present content for experiencing by the user 108. Display 112 may include, but is not limited to, a television, a computer screen, a wireless device, a mobile phone, and any device or devices configured to display content, or at least a component thereof, for viewing by the user 108. The speaker 111 may be integrated with or separate from the display 112. In certain embodiments, content processing device 110 is configured to provide content to one or more of the output devices for presentation to the user 108. The output devices may be separate from or integrated with the content processing device 110.

The content processing subsystem 104 may include one or more devices or components configured to communicate with the user device 106, including receiving communications from and/or providing communications to the user device 106. Any suitable communication technologies may be used, including wireless communication technologies such as an infrared (IR) or radio frequency (RF) link. In certain embodiments, content processing device 110 is configured to communicate with the user device 106.

Figure 2:
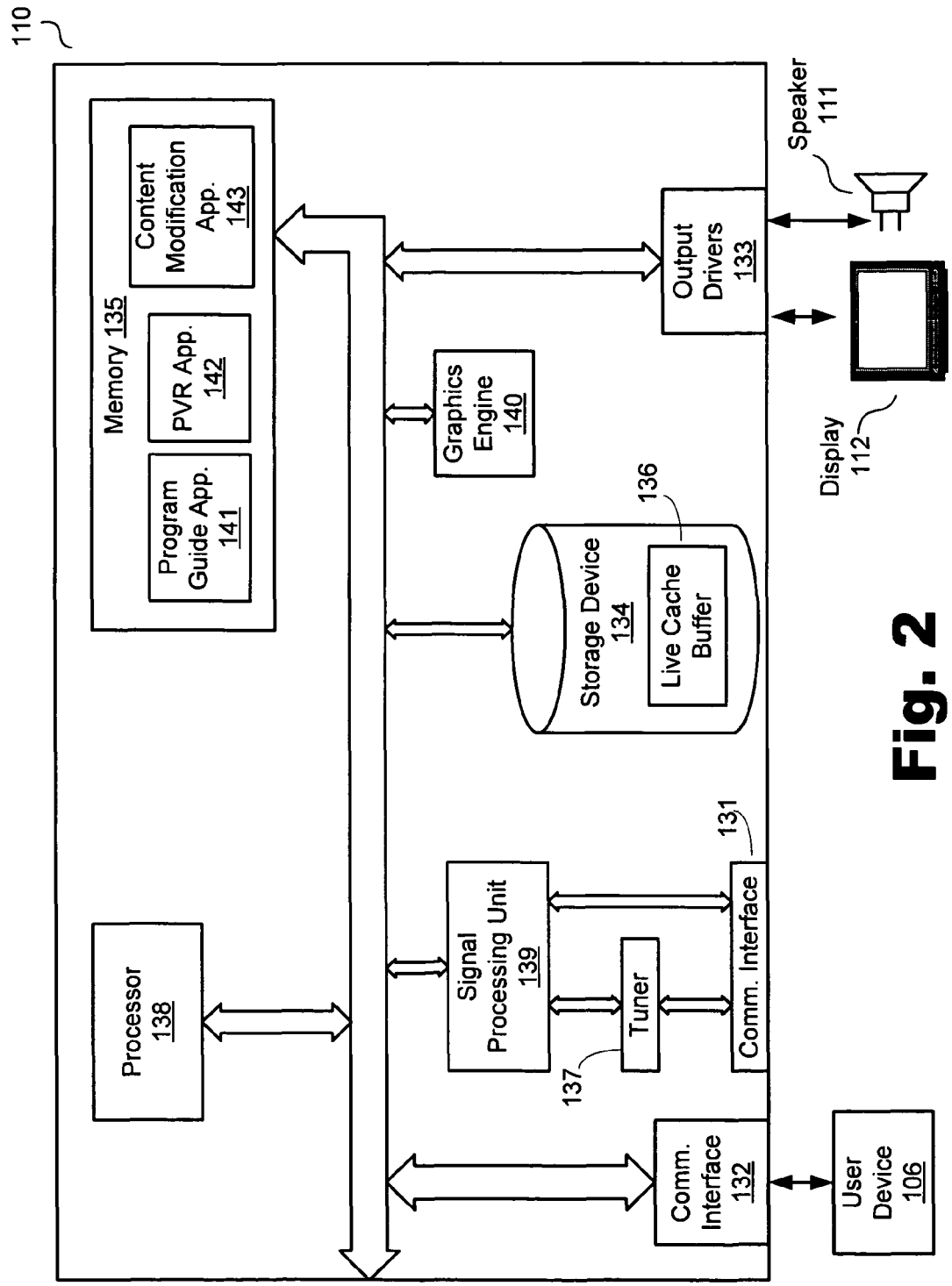
FIG. 2 is a block diagram of an exemplary content processing device, according to an embodiment.

FIG. 2 is a block diagram of an exemplary content processing device 110 (or simply "processing device 110") according to an embodiment. The processing device 110 may include any combination of hardware, software, and firmware configured to process content, including an incoming media content stream. Content processing device 110 may include any device or devices configured to provide digital and/or analog content such as media content for experiencing by the user 108. Content processing device 110 may also include any receiver configured to receive and decode digital and/or analog content such as media content. Hence, an exemplary processing device 110 may include, but is not limited to, a set-top box (STB), home communication terminal (HCT), digital home communication terminal (DHCT), stand-alone personal video recorder (PVR), digital video disc (DVD) player, and personal computer.

While an exemplary processing device 110 is shown in FIG. 2, the exemplary components illustrated in FIG. 2 are not intended to be limiting. Indeed, additional or alternative components and/or implementations may be used. For example, the components and functionality of processing device 110 may be implemented on one or more physical devices. Various components of the processing device 110 will now be described in additional detail.

1. Communication Interfaces

As shown in FIG. 2, the processing device 110 may include a communication interface 131, which may be configured to communicate with and receive content from an external source such as a media content provider. Content may be received in any suitable form, including a data stream, for example. The content processing device 110 and media content provider may communicate using any known communication technologies, devices, media, and protocols supportive of remote data communications, including, but not limited to, cable networks (e.g., a hybrid fiber-coax network), subscriber television networks, wireless broadcast networks (e.g., a satellite media broadcasting network or terrestrial broadcasting network), the Internet, intranets, local area networks, wireless networks (e.g., mobile telephone networks), optical fiber networks, packet-switched networks, telephone networks, provider-specific networks (e.g., a Verizon® FIOS® network and/or a TiVo® network), data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, and other suitable communications networks and technologies.

The processing device 110 may also include a communication interface 132 for communicating with the user device 106, including receiving input signals from the user device 106. The user device 106 may be configured to communicate with the communication interface 132 via any suitable one-way or two-way communication link including one or more wireless links. In certain embodiments, the communication link allows the user device 106 to be portable with respect to the processing device 110. A wireless link such as an IR link or radio frequency link, for example, may enable the user device 106 to change location relative to the processing device 110 while remaining communicatively coupled to the processing device 110.

The processing device 110 may also include one or more output drivers 133 configured to interface with or drive output devices, including, but not limited to, the speaker 111 and display 112. The output drivers 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. Content, and/or various portions of content, may be temporarily and/or permanently stored in the storage device 134. The processing device 100 may access and provide content stored in storage device 134 to one or more output devices for presentation to the user 108.

The storage device 134 of FIG. 2 is shown to be a part of the processing device 110 for illustrative purposes only. It will be understood that the storage device 134 may additionally or alternatively be located external to the processing device 110.

The processing device 110 may also include memory 135. Memory 135 may include, but is not limited to, FLASH memory, random access memory (RAM), dynamic RAM (DRAM), or a combination thereof. In some examples, as will be described in more detail below, various applications (e.g., a PVR application) used by the processing device 110 may reside in memory 135.

As shown in FIG. 2, the storage device 134 may include one or more live cache buffers 136. The live cache buffer 136 may additionally or alternatively reside in memory 135 or in a storage device external to the processing device 110. As is well known, content data may be temporarily stored in the live cache buffer 136 to facilitate viewing of the content in one or more trick play modes.

3. Tuner

Tuner 137 may be configured to tune to a particular content (e.g., television) channel, stream, address, frequency or other carrier in order to process content that is transmitted on that carrier. In some examples, the tuner 137 may include multiple tuners such that multiple carriers of content may be processed. For example, the tuner 137 may include a first tuner configured to receive an analog video signal corresponding to a first content instance and a second tuner configured to simultaneously receive a digital compressed stream corresponding to a second content instance. It will be recognized that the tuner 137 may have any number of tuners configured to receive any kind of content.

In some examples, content received at the tuner 137 is temporarily buffered, or stored, in the live cache buffer 136. If there are multiple tuners 137, there may be a live cache buffer 136 corresponding to each of the tuners 137. Once content is temporarily stored in the live cache buffer 136, the user may then designate whether the content is to be permanently stored as a permanent recording in the storage device 134 or whether it is to be deleted. As used herein, the term "permanent recording" will be understood to mean content that is stored for an extended period of time as decided by the user.

While tuner 137 may be used to receive various types of content-carrying signals, processing device 110 may be configured to receive some types of content-carrying signals without using a tuner. For example, a content provider may broadcast digital streams of data packets (e.g., Internet Protocol (IP) based data packets) that can be received by the processing device 110 without using a tuner. For such types of content-carrying signals, the communication interface 131 may receive and forward the signals directly to signal processing unit 139 without going through the tuner 137. For an IP-based content signal, for example, the signal processing unit 139 may function as an IP receiver.

4. Processors

As shown in FIG. 2, the processing device 110 may include one or more processors, such as processor 138 configured to control the operations of the processing device 110. The processing device 110 may also include a signal processing unit 139 configured to process incoming content and/or content-carrying signals. The signal processing unit 139 may be configured, for example, to demodulate and parse encoded digital content. In some examples, the processing device 110 may include one or more signal processing units 139 corresponding to each of the tuners 137 and/or a signal processing unit 139 for processing content received without using tuner 137. The processing device 110 may also include a graphics engine 140 configured to generate graphics that are to be provided for display by the display 112.

Various components of the processing subsystem 110 may be configured to modify content or certain elements of content. For example, processor 138 and/or graphics engine 140 may perform operations for modifying content, including visual elements of the content. Similarly, processor 138 and/or a sound card (not shown) may perform operations for modifying content, including audio elements of the content. Components of the processing subsystem 110 may be configured to modify content in any of the ways described herein, including, but not limited to, adding elements (e.g., visual elements) to content, scaling content (e.g., increasing or decreasing audio volume levels and/or resizing visual elements), removing (e.g., cropping) elements from content, filtering content, anti-aliasing content, smoothing content, stretching content, rotating content, skewing content, adjusting properties (e.g., font, contrast, size, color, orientation, etc.) of content, and otherwise modifying content. Content may be modified dynamically, including as it is being prepared for output to one or more output devices.

Content modification may include changing playback functions and/or attributes, including pausing and/or restarting playback of the content. For example, playback of content may be configured to be paused when a positional relationship exceeds a predefined threshold (e.g., a distance relationship exceeds a predefined distance) and resumed when the positional relationship does not exceed the predefined threshold.

5. Application Clients

One or more applications 141-143 residing within the processing device 110 may be executed upon the occurrence of predefined events such as initiation by a user of the processing device 110. The applications 141-143, or application clients, may reside in memory 135 or in any other area of the processing device 110 and be executed by the processor 138.

Figure 6:
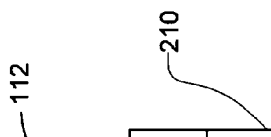
FIG. 6 illustrates an example of a viewing screen with an exemplary program guide displayed thereon, according to an embodiment.

As shown in FIG. 2, one of the applications may be a program guide application 141 configured to generate a program guide that is displayed on the display 112. An exemplary program guide includes a graphical user interface (GUI) that performs various functions including allowing the user 108 to select and view program information associated with various content instances. FIG. 6, which will be described further below, illustrates an exemplary user interface displaying a program guide.

The processing device 110 may also include a personal video recording (PVR) application 142. A PVR application is also referred to as a digital video recording (DVR) application. As used herein and in the appended claims, unless otherwise specifically denoted, the term "PVR application" will be used to refer to any application and/or device configured to record content and/or provide for the viewing of content in normal or trick play mode. As previously mentioned, trick play modes include, but are not limited to, slow motion, fast motion, reverse play, fast forward play, instant replay, jumping, pausing of live broadcast, and scanning. The PVR application 142 may also provide for content recording functionality by enabling the temporary and/or permanent recording of content to the storage device 134.

In some examples, the PVR application 142 may be integrated into the processing device 110, as shown in FIG. 2, or it may be a stand-alone unit. A stand-alone PVR may be coupled to the processing device 110 or it may be used in place of the processing device 110. In the examples contained herein, it will be assumed that the PVR application 142 is integrated into the processing device 110 for illustrative purposes only.

The processing device 110 may include a content modification application 143 configured to cause execution of operations for modifying content based on a positional relationship between the user device 106 and the processing device 110. The content modification application 143 may be launched upon detection of an occurrence of a predefined event such as initiation of the application 143 or of a content modification mode by the user 108. For example, the user 108 may actuate a button on the user device 106 that has been preconfigured to launch the content modification application 143.

The content modification application 143 may be configured to modify content periodically, continually, in real time or near real time, dynamically as output is being prepared to be provided to one or more output devices, or in response to a predefined event such as a user actuating a preconfigured (e.g., dedicated) button or any button on the user device 106.

B. User Device

The user device 106 may include one or more devices or components configured to communicate with the content processing subsystem 104 or any component (e.g., the content processing device 110) of the content processing subsystem 104. As mentioned above, any suitable communication technologies may be used, including wireless communication technologies such as an infrared (IR) or radio frequency (RF) link.

The user device 106 may include one or more devices that is physically portable in relation to the content processing subsystem 104 or any component of the content processing subsystem 104. The portability enables the user device 106 to be physically proximate to the user 108 even as the user moves about (i.e., changes location) in relation to the content processing subsystem 104. The user device 106 may include, but is not limited to, a remote control device, a wireless phone, a universal remote control device, a personal digital assistant, a watch, a pager, headphones, a laptop or tablet computer, an entertainment device (e.g., an audio device such as a digital music player), or any other device that may be physically proximate to a mobile user (e.g., user 108) and that may communicate with the content processing subsystem 104.

Figure 3:
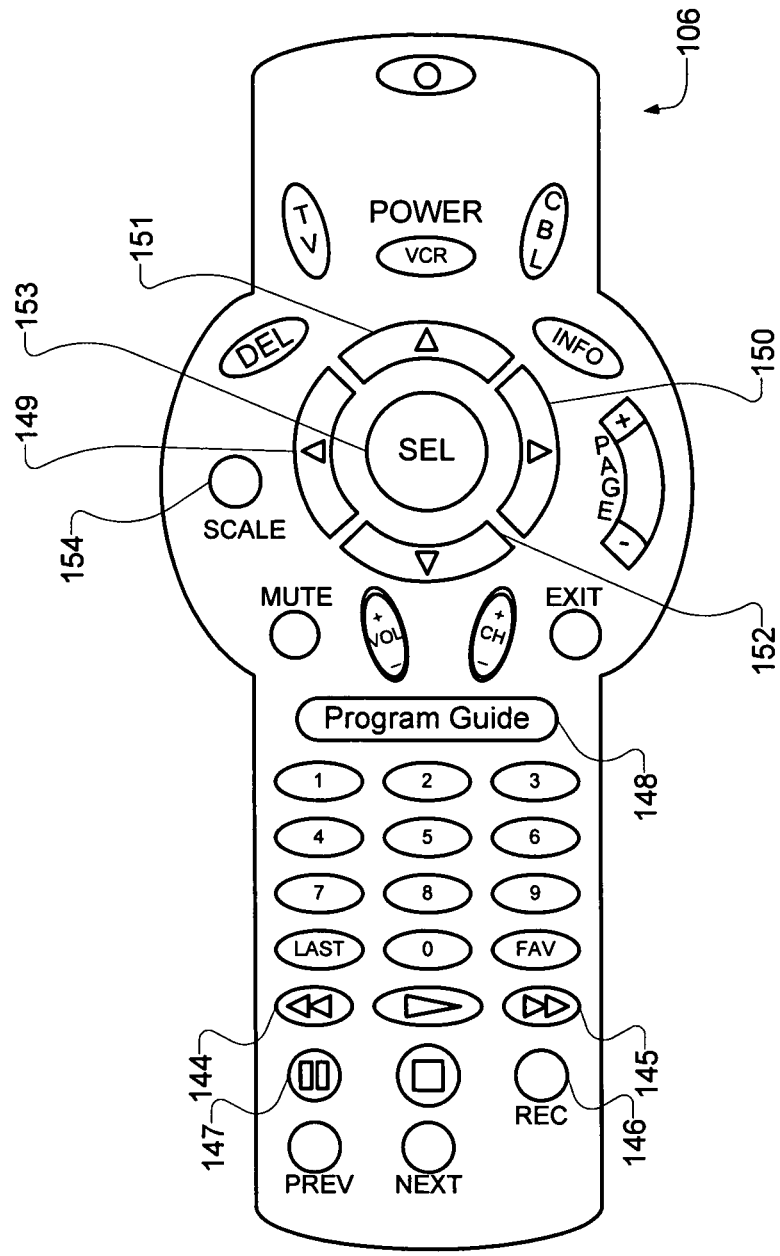
FIG. 3 illustrates an exemplary user device, according to an embodiment.

In certain embodiments, the user device 106 includes a remote control device such as that shown in FIG. 3. In some examples, the user device 106 may be configured to enable the user 108 to provide various input signals (e.g., commands) for controlling various settings and operations of the content processing subsystem 104. For example, rewind 144 and fast-forward buttons 145 enable a user to access different scenes or frames within media content stored in a live cache buffer 136. A record button 146 may also be included which enables the user to designate as permanently recorded any content instance buffered in the live cache buffer 136. A pause button 147 may enable the user to pause a content instance. A program guide button 148 may be configured to evoke the presentation of a program guide on the display 112. A left button 149, right button 150, up button 151, and down button 152 may be included and configured to enable the user to navigate through various views and menus displayed by the display 112.

The user 108 may also be provided with one or more tools for controlling the content modification operations described herein. For example, a button on the user device 106, such as select button 153 or scale button 154, may be configured to launch the content modification application 143 when actuated by the user 108, or to toggle a content modification mode between an "activated" status and a "deactivated" status. In certain embodiments, actuation of a preconfigured button (e.g., the select button 153 or the scale button 154) may initiate an instance of content modification, which may include determining a positional relationship and modifying content based on the positional relationship. In other embodiments, actuation of any button on the user device 106 may initiate an instance of content modification. Accordingly, the user 108 may utilize the user device 106 to initiate an updating of positional relationship data and a corresponding modification of content.

In certain embodiments, system 100 may automatically modify content without waiting for a user command. For example, when a content modification mode is "active" (e.g., content modification application is executing), a positional relationship may be determined periodically (e.g., by periodically polling), continually, in real time or near real time. For example, frequent polling may be used to periodically determine a positional relationship.

A detected event such as a change in the positional relationship may cause system 100 to initiate a determination of a positional relationship (e.g., by polling user device 106 and/or content processing subsystem 104) and/or modify content accordingly. For example, user device 106 may include a sensor (e.g., a gyroscopic sensor) or other technology configured to detect movement of the user device 106. When movement is detected, a polling operation may be initiated for determining a positional relationship between the user device 106 and the content processing subsystem 104. Content may then be modified based on the positional relationship.

The user 108 may also utilize the user device 106 to customize thresholds (e.g., distance ranges) and/or other settings that will affect content modification, as described below. The user device 106 shown in FIG. 2 is merely illustrative of the many different types of user devices that may be used in connection with the present systems and methods.

C. Examples of Determining Positional Relationship

A modification of content based on a positional relationship may include or be preceded by a determination of the positional relationship. Accordingly, a positional relationship, or a change to a positional relationship, can be detected and the content modified accordingly. In general, the positional relationship may be used to approximate a relationship between the location of the user 108 and the location of the content processing subsystem 104 or a component thereof.

In certain embodiments, system 100 is configured to use communications transmitted between the user device 106 and the content processing subsystem 104 to determine a positional relationship between the user device 106 and the content processing subsystem 104. For example, processing device 110 may be configured to determine the positional relationship between the user device 106 and the content processing subsystem 104 based on information explicitly or implicitly included in communication signals transmitted between the user device 106 and the content processing device 110.

Figure 4:
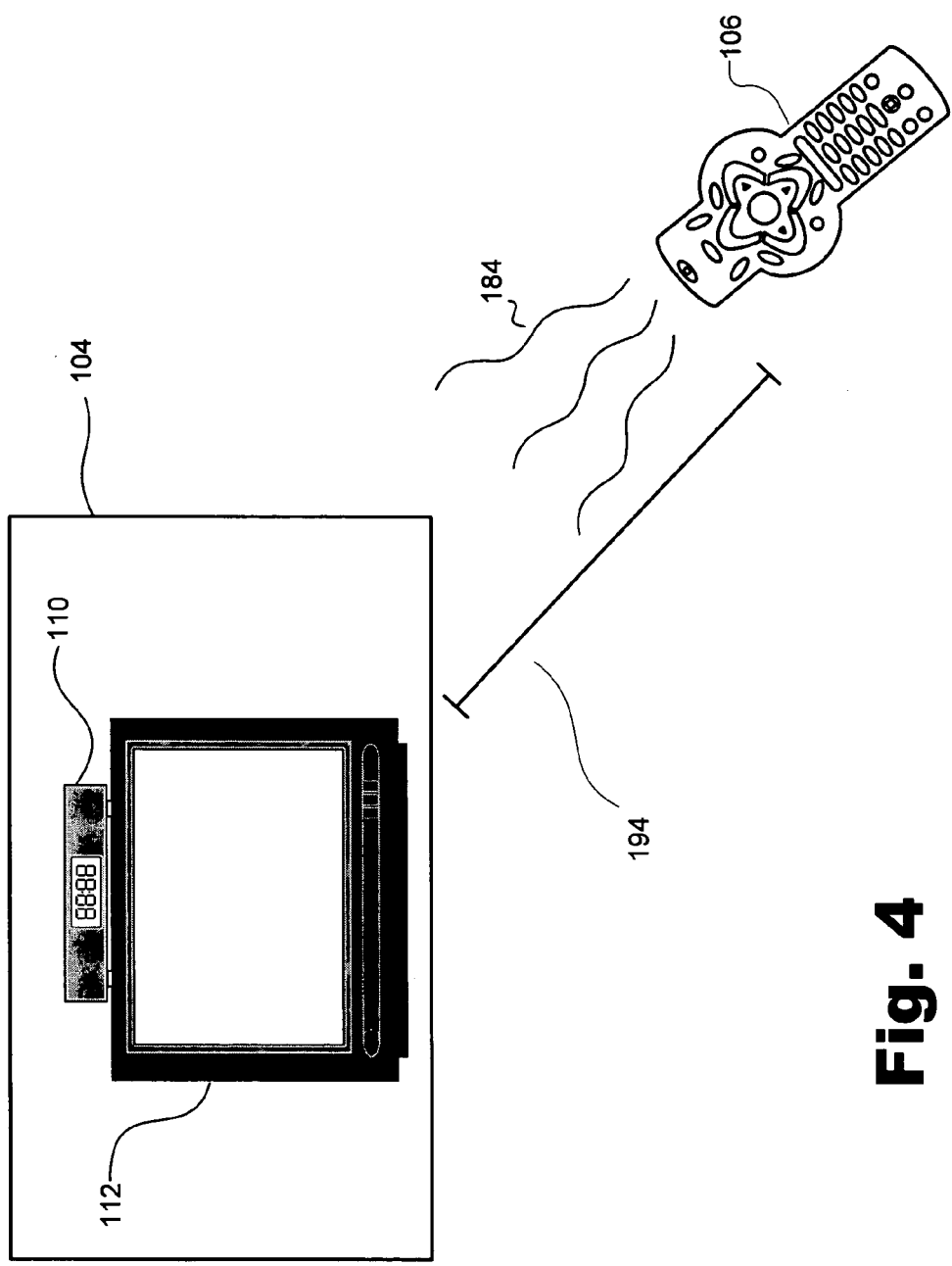
FIG. 4 illustrates an example of a positional relationship between an exemplary content processing subsystem and user device of FIG. 1, according to an embodiment.

FIG. 4 illustrates the user device 106 transmitting a wireless signal 184 to the content processing subsystem 104. The wireless signal 184 may be an infrared, radio frequency (radio frequency identification (RFID)), or other suitable wireless signal. The user device 106 may include any suitable technologies for transmitting communication signals to the processing subsystem 104, including, but not limited to, IR and RF transmitters (RFID tags). The communication interface 132 of the content processing device 110 may be configured to receive the wireless signal 184 as described above. The content processing device 110 may use the wireless signal 184 to determine a positional relationship with the user device 106.

In certain embodiments, for example, content processing device 110 may be configured to measure the intensity of the wireless signal 184 that is received and use the measured intensity to determine or approximate a positional relationship including the distance 194 between the user device 106 and the content processing device 110. As is well known, the intensity of wireless signals tends to decrease as the signals travel greater distances. Accordingly, the intensity of the wireless signal 184 can be used to determine or approximate the distance 194 from the processing device 110 to the user device 106. Any suitable technologies for measuring the intensity of a wireless signal may be used.

In certain embodiments, the measured intensity of the wireless signal 184 is used to identify the distance 194 as being within a predefined range of distances. For example, ranges of signal intensities may be predefined as corresponding to respective ranges of distances. Accordingly, the measured intensity can be used to identify a corresponding range of distances that includes distance 194.

Content processing device 110 may be configured to enable the user 108 to calibrate settings (e.g., detection sensitivity) for measuring signal intensity. Accordingly, the measurement of signal intensity and its use in determining distance can take into account various environmental factors that may affect the intensity of the wireless signal 184. In an exemplary calibration, the user 108 may position the user device 106 a predefined configuration distance away from the processing device 110 and actuate a button on the user device 106 to cause a wireless signal 184 to be transmitted to the processing device 110, which may measure the intensity of the received signal 184 and correlate it to the predefined distance. This correlation can then be used to assign signal intensities to distances, or ranges of signal intensities to ranges of distances. Accordingly, the accuracy of subsequent determinations of distance 194 may be improved because the calibration accounts for environmental factors that are present during calibration and are likely present during subsequent distance determinations.

While the above description refers to using signal intensity to determine a positional relationship including distance 194, any other suitable properties of the wireless signal 184 may also be used to determine a positional relationship, including, but not limited to, signal pattern, duration, timing, phase, and frequency. For example, user device 106 and content processing device 110 may be configured to perform handshaking or other suitable communications that facilitate a determination of the time for a wireless signal 184 to travel between the devices. The determined time may be indicative of transmission delay of a communication signal, and the transmission delay may be used to determine an approximate distance 194 traveled by the wireless signal 184. Similar to the example described above, an initial transmission delay may be determined for a predefined calibration distance and the calibration used to correlate time delays to distances.

Other suitable processes and technologies for determining the distance 194 may be employed. For example, a distance sensor (e.g., an ultrasonic, IR, RF, or other type of distance sensor) may be incorporated in the processing subsystem 104 or the user device 106. A distance sensor included in the user device 106 may be configured to transmit a wireless signal (e.g., wireless signal 184) generally toward the processing subsystem 104 and use the transmitted wireless signal and/or response signal to determine the distance 194. The user device 106 may then transmit the determined distance to the processing subsystem 104 for use in modifying content.

In some embodiments, well-known triangulation principles and technologies may be implemented in system 100 and used to determine distance 194. Other devices communicatively coupled to content processing subsystem 104 and/or user device 106 may be leveraged for use in triangulation operations and/or for improving accuracy of triangulation-based determinations.

Figure 5:
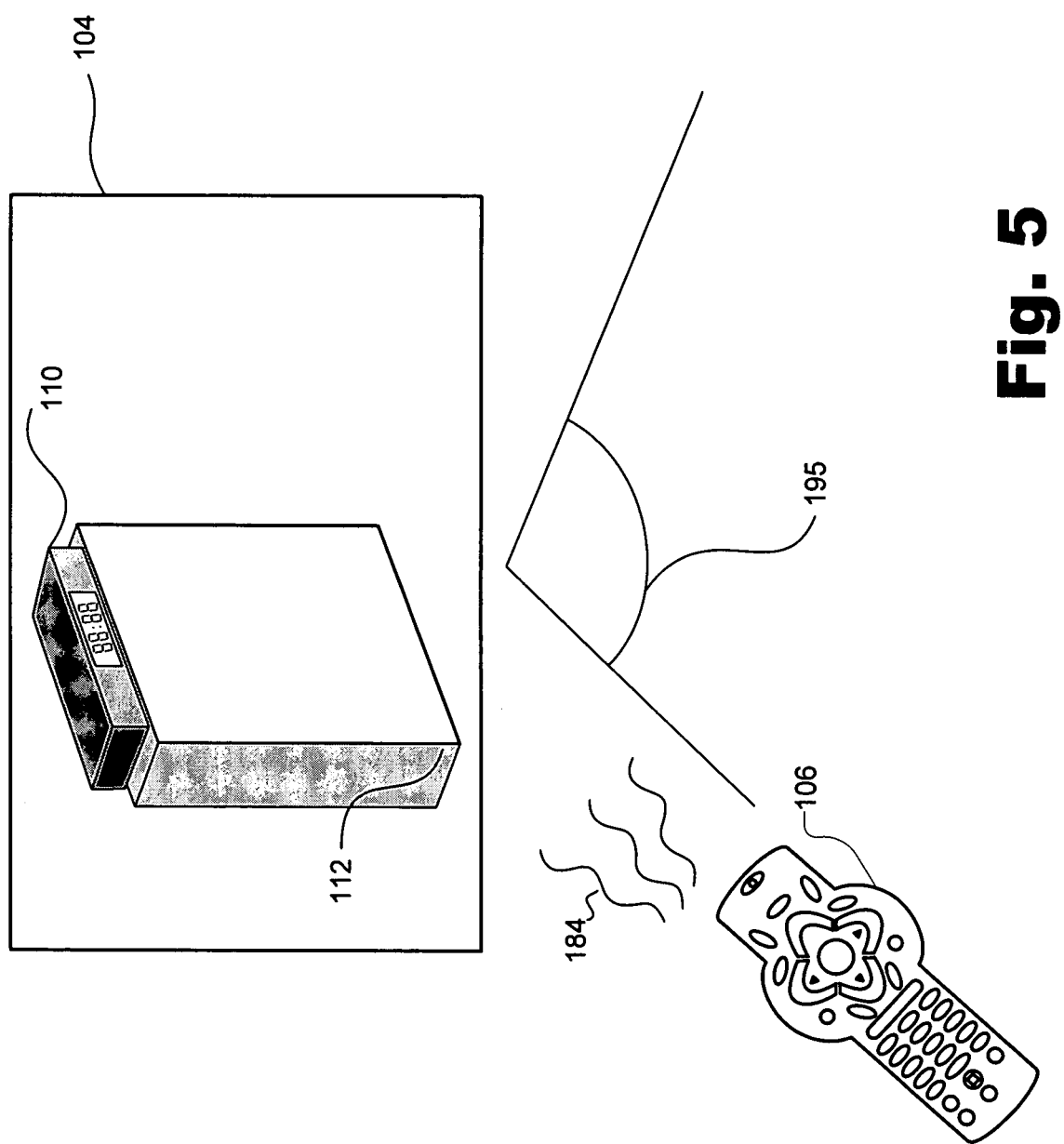
FIG. 5 illustrates another example of a positional relationship between an exemplary content processing subsystem and user device of FIG. 1, according to an embodiment.

Additionally or alternatively, other positional relationships, or types of positional relationships, may be determined and used to modify content. For example, a positional relationship may include any information descriptive of a distance, angle, orientation, direction, or other physical relationship between the user device 106 and the content processing subsystem 104. FIG. 5 illustrates an angular positional relationship between the user device 106 and a component of the content processing subsystem 104. Angle 195 is indicative of an incident angle between the user device 106 and an approximation of a plane that is generally perpendicular to a display of content. The angle 195 may generally approximate the viewing angle of the user 108.

Any suitable technologies may be employed for determining the angle 195. For example, the communication interface 132 of the content processing device 110 may be configured to detect the incident angle of a wireless signal 184 transmitted by the user device 106. Alternatively, the processing device 110 may be configured to transmit signals at different angles (e.g., a sweep across various angles) and wait to receive a response from the user device 106 indicating its location.

Content may be modified based on a positional relationship, including any of the exemplary positional relationships described above. In cases in which a positional relationship includes an angular relationship approximating a viewing angle of the user 108, for example, content may be modified to help compensate for the viewing angle by adjusting the content, or at least one element of the content, to improve its intelligibility from the viewing angle. In cases in which a positional relationship includes a distance relationship, for example, content may be modified to help compensate for the distance. The content may be modified in any of the ways described above, including, for example, scaling (e.g., enlarging), stretching, rotating, angling, skewing, or otherwise modifying content (or at least one element of the content) to improve its visibility from the approximated viewing angle and/or distance, or to enhance the user experience. Examples of content modification will now be described.

D. Exemplary Content Modifications

To facilitate an understanding of content modification features and functionality that may be provided by the system 100, FIGS. 6-9 illustrate exemplary content modifications that can be performed by various components of the system 200, according to an embodiment.

As illustrated in FIG. 6, a viewing screen 210 of an exemplary display 112 may present content including a program guide. The display of content shown in FIG. 6 represents a first output of the content. The first output of content may display the content according to a default or normal size of the content without scaling (i.e., change in size), or it may be the result of a previous scaling of content. The volume level of audio elements of content, if present, may also be set at a default, normal, or previously scaled value. Processing subsystem 104 may be configured to present un-scaled content in certain situations, including, but not limited to, when a content modification mode is not active, when the user device 106 has an optimum positional relationship with the processing subsystem 104 (e.g., the user device 106 is a predefined calibration distance from the processing subsystem 104), or before a positional relationship has been determined.

While an un-scaled presentation of content may provide an adequate user experience in some situations, the user experience may be unsatisfactory in other situations, such as when the user 108 is a considerable distance from the display 112. FIG. 7 illustrates the exemplary viewing screen 210 and program guide of FIG. 6 with the program guide having been scaled to a larger size based on an increase in distance between the user 108 and the processing subsystem 104. As shown in FIG. 7, scaling of the content may include enlarging and/or expanding of visual elements to make the elements more visible from a distance. As illustrated, the scaling of the content may include omitting or cropping other elements of the content. In certain embodiments, elements located generally central in the display shown in FIG. 6 may be enlarged to substantially fill the display shown in FIG. 7, and elements generally about the edges of the display of FIG. 6 may be omitted from the display of FIG. 7. The resizing of content, including the enlarging of content illustrated in FIGS. 6 and 7 may be performed in any suitable manner, including changing the resolution of and/or moving a graphical interface in relation to a display of content. The modified content may be provided in a subsequent output signal for presentation to the user 108.

A user who moves farther away from the display 112 may better experience content that is enlarged even though less information is shown in the viewing screen 210. Content scaling may also be used to reduce the size of content for display. A user that moves closer to the display 112 may better experience content that is scaled smaller and that allows more information to be displayed.

The scaling of content may include utilizing one or more filtering or processing transformations. With respect to the scaling of visual elements of content, filtering can help to reduce the severity of visual artifacts or to otherwise enhance the quality of the scaled content for display. As visual content is enlarged, for example, individual pixels are typically accentuated, which may create unsightly jagged edges. To improve the quality of scaled content and enhance the user experience, the processing subsystem 104 may be configured to apply filters or other processing techniques for smoothing, anti-aliasing, resizing, or otherwise enhancing an image, text, or other visual content.

The scaling of content may also take into account various predefined conditions, policies, preferences, and attributes. For example, one or more attributes of an output device (e.g., display 112) may be factored into the scaling. For instance, content may be scaled less for a display 112 having a large screen than for a display 112 having a small screen.

Alternatively or additionally, one or more attributes or properties (e.g., resolution of visual content) of the content to be scaled may be factored into scaling operations. In certain embodiments, for example, the system 100 may be configured to scale certain elements or types of elements included in content (e.g., textual elements) and not scale other elements or types of elements included in the content (e.g., video elements). Metadata or other information included in or associated with content may be used to identify specific elements or types of elements included in content.

Figure 8:
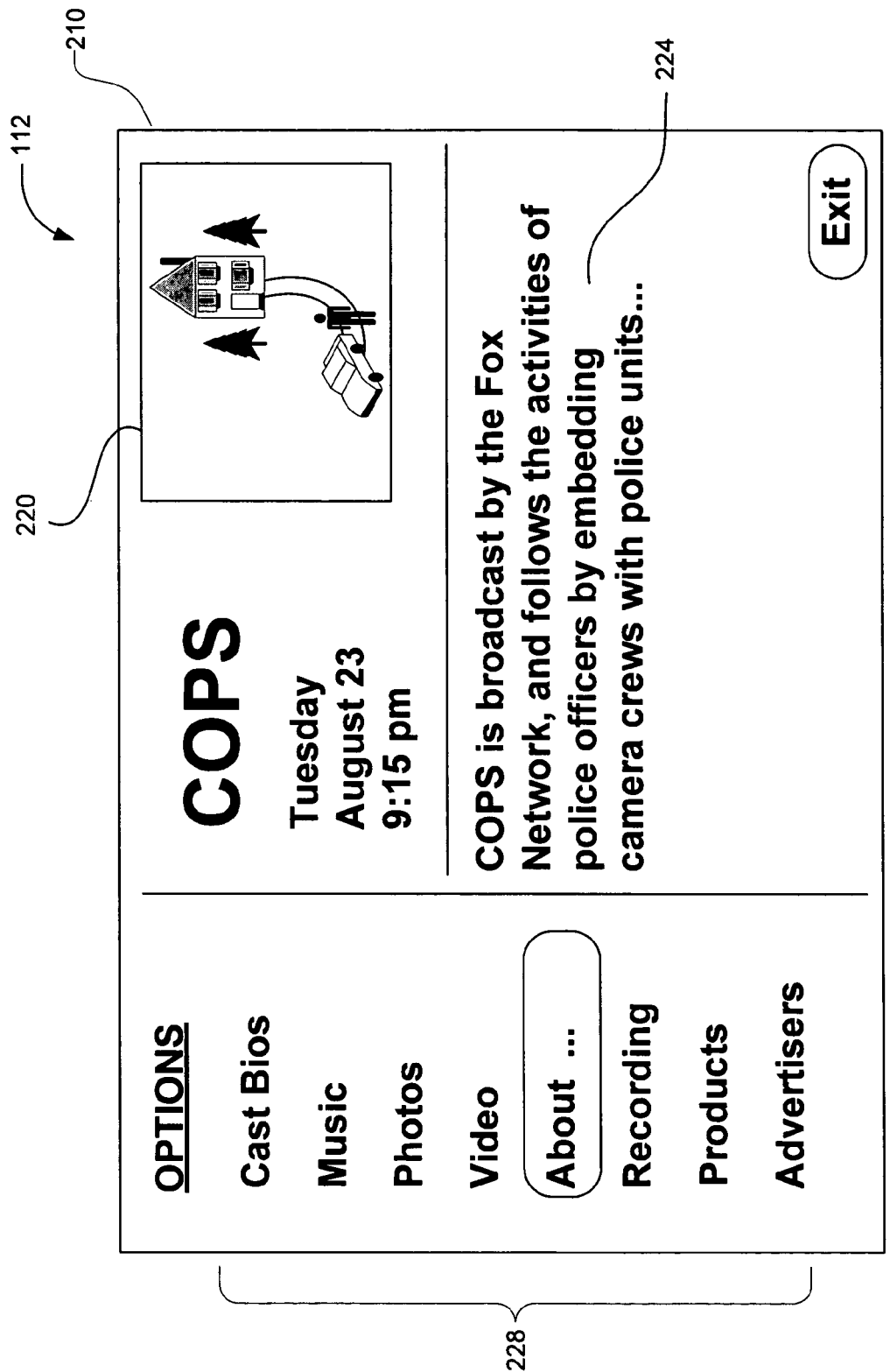
FIG. 8 illustrates another exemplary user interface displayed in the viewing screen of FIG. 6, according to an embodiment.

FIG. 8 illustrates the viewing screen 210 displaying both video elements 220 and textual elements 224 of content. As shown in the exemplary embodiment of FIG. 9, textual elements 220 may be scaled (e.g., enlarged) while the video elements 224 are not scaled. By not scaling the video elements 220 of the content, processing demands associated with content scaling are minimized while textual content is enlarged for improved visibility from a distance.

Figure 9:
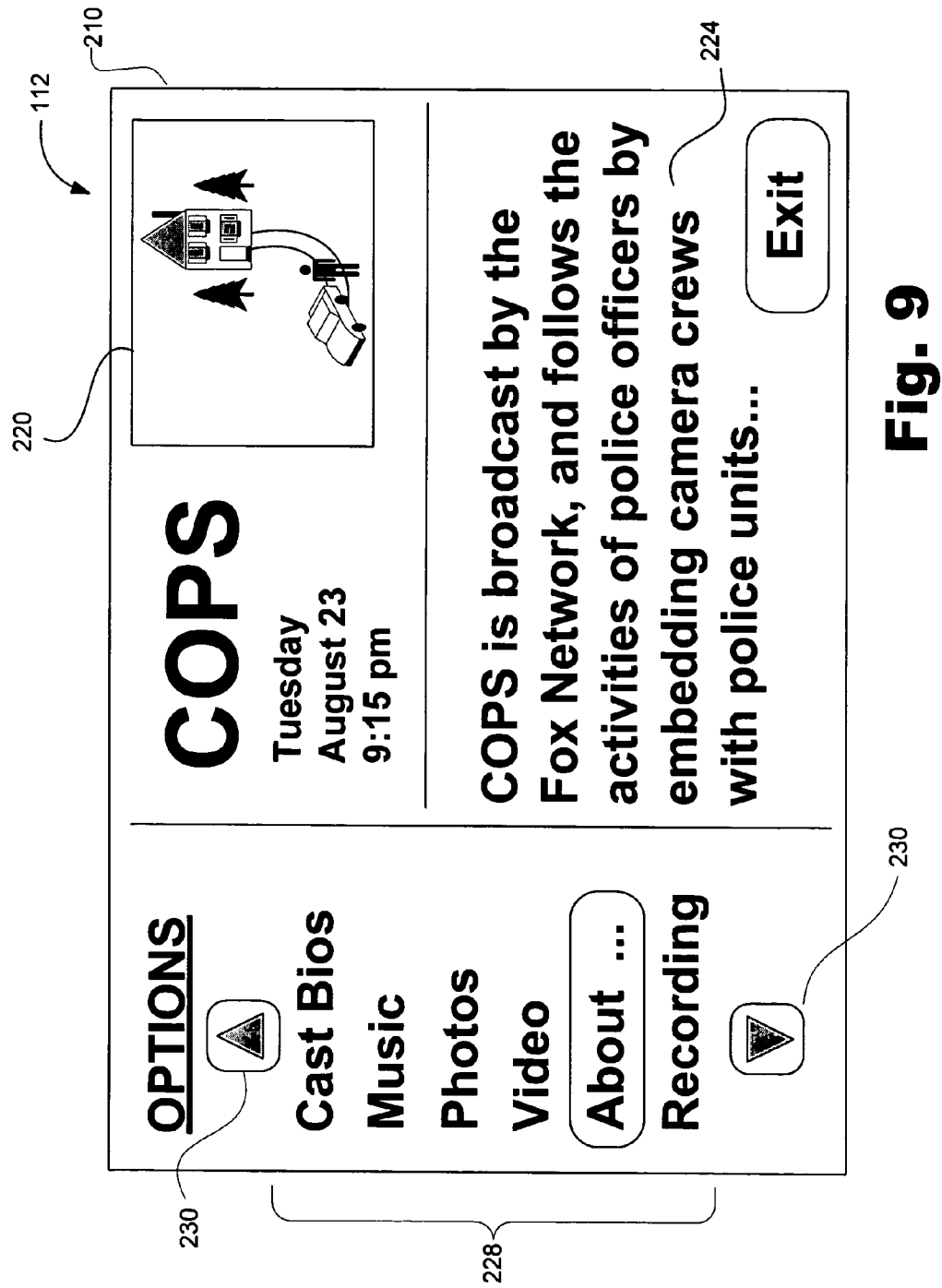
FIG. 9 illustrates the user interface of FIG. 8 with various elements of the user interface having been modified based on a positional relationship, according to an embodiment.

Other aspects of content may also be modified. For example, the layout of a display of content may be adjusted. Layout modifications may include, but are not limited to, resizing visual elements, repositioning visual elements, summarizing or omitting information, and adding navigational tools. FIGS. 8 and 9 illustrate a modification to a display of options 228 included in content. The scaling of the content as illustrated in FIG. 9 includes the display of options 228 having been modified such that only a subset of the options 228 is displayed and one or more scroll buttons 230 are added for navigating through the options 228.

While FIGS. 6-9 illustrate exemplary scaling operations in relation to modifying the size of visual elements of content based on a distance between the user device 106 and the processing subsystem 104, this is illustrative and not limiting. Other elements of content may be modified, including adjusting the volume level of audio elements of content, for example. Moreover, the modification of content may include changes other than resizing and may be based on one or more components of a positional relationship other than or in addition to distance.

The content processing subsystem 104 may be configured to perform content modification operations in response to a detection of a predetermined event. For example, a content modification may be performed in response to a command initiated by the user 108. As mentioned above, the user 108 may actuate a button or other control tool on the user device 106 to initiate content modification or to activate a content modification mode.

According to certain embodiments, content processing subsystem 104 may modify content when a positional relationship satisfies a predetermined criterion or criteria. For example, content may be modified when the positional relationship, or a change in the positional relationship, meets a predetermined threshold. With respect to a positional relationship including a distance component, for example, content may be modified when the distance exceeds a predetermined distance threshold, when the distance is within a particular range of distances, when the distance is at least a predetermined amount greater or less than the previous distance measurement, or when the distance is included in a different range of distances than the previous range of distances (i.e., the distance as compared to the previous distance crosses into another range of distances).

In certain embodiments, content processing subsystem 104 may be configured to cease (e.g., pause) playback of content when a positional relationship exceeds a predefined threshold. For example, a predefined distance threshold may be defined such that when distance 194 exceeds the predefined distance threshold, the playback of content is paused. Playback may be resumed when the distance 194 does not exceed the predefined distance threshold. This feature enables content to be automatically paused and resumed based on an approximated location of a user. For instance, user 108 may set a distance threshold to approximate a distance from content processing subsystem 104 to a doorway of the room in with the content processing subsystem 104 is located such that when the user 108 carrying the user device 106 exits the room through the doorway, the playback of content is automatically paused. The playback may be automatically resumed when the user 108 carrying the user device 106 reenters through the doorway (i.e., the distance 194 between the user device 106 and the content processing subsystem 104 no longer exceeds the predefined distance threshold).

The extent to which content is modified may be based on a positional relationship. In certain embodiments, for example, a positional relationship may include a distance component, and the extent of the content modification may be based on the value of the distance component. The extent to which the content is modified may be proportional to the value of the distance.

In certain embodiments, different ranges of distances may be predefined and assigned different modification factors (e.g., scaling factors such as a constant, a ratio, or a percentage). Accordingly, content may be modified by applying a modification factor to one more elements of the content, where the modification factor is selected based on the distance. In certain embodiments, relatively larger scaling factors may be applied for relatively greater distances, and relatively smaller scaling factors may be applied for relatively shorter distances.

The processing subsystem 104 may provide the user 108 with tools for configuring (e.g., personalizing) various content modification settings. In certain embodiments, for example, the user 108 may be provided one or more tools for selecting types of content and/or types of content elements to be modified based on a positional relationship. Accordingly, the user 108 may elect to enable content modification only for program guide information or only for textual elements of content. By way of another example, the user 108 may elect to modify only visual content but not audio content, or vice versa. In yet another example, the user 108 may set thresholds (e.g., a maximum distance threshold) that will be used to determine when to modify content and/or to what extent the content will be modified. This allows the user 108 to specify distances, or ranges of distances, for example, at which content will be modified or not modified. For example, the user 108 may configure the processing subsystem 104 to modify content when a positional relationship includes a distance greater than a specific threshold distance.

The configuration tools may also enable the user 108 to elect when content modification will be performed, including selecting between periodically modifying content (e.g., polling every five seconds), modifying content in response to a signal received from the user device 106, or dynamically modifying content in real time or near real time as long as a content modification mode is active.

The configuration tools may enable the user 108 to modify a default scale of content to better fit the preferences of the user 108. During setup of content processing subsystem 104, for example, the content processing subsystem 104 may provide the user 108 with tools for testing and tweaking the default scale of content, including the default scale of a graphical user interface. In certain embodiments, setup includes an automated eye exam feature that provides configuration output (e.g., configuration content such as an eye exam chart, audio content, or other visual content), prompts for, and accepts input from the user 108. Accordingly, the user 108 may be at a preferred position relative to the content processing subsystem 104 (e.g., sitting on a couch) and provide feedback (e.g., too small, too large, identification of content being presented) to the content processing subsystem 104 to indicate whether configuration output (i.e., test content) is viewable and/or presented as desired. Based on the feedback, the content processing subsystem 104 can adjust the default scale of the content to tailor content to the user 108.

Of course, setup is not limited to testing the readability of visual content. The default scale for other components of content, including audio content can also be adjusted based on, for example, an automated hearing-type test. Because different users have different vision and/or hearing capabilities, the exemplary setup features described above may provide significant accessibility benefits to many users, including users with vision and/or hearing impairments.

The above-described content modification operations can be employed in system 100 and used to dynamically modify content based on a positional relationship between the content processing subsystem 104 and the user device 106. This is especially beneficial to users who prefer to change their locations while experiencing content. As the user moves, the system 100 can determine the positional relationship, or changes or the positional relationship, and modify content, or at least one element of the content, in a manner that helps enhance the experience that the user will have in experiencing the content from different locations.

III. Exemplary Process View

Figure 10:
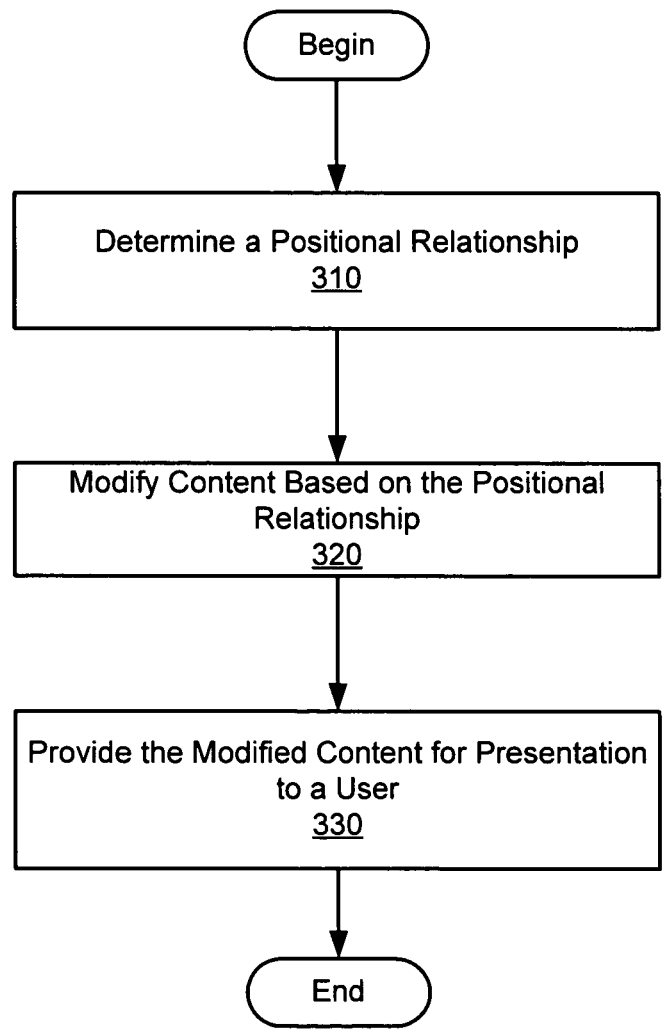
FIG. 10 is a flowchart illustrating a method of modifying content based on a positional relationship, according to an embodiment.

FIG. 10 illustrates an exemplary method of modifying content based on a positional relationship, accordingly to an embodiment. While FIG. 10 illustrates exemplary steps according to one embodiment, other embodiments may omit, add to, reorder, and/or modify any of the steps shown in FIG. 10.

In step 310, a positional relationship is determined. Step 310 may be performed in any of the ways described above, including determining a positional relationship between user device 106 and processing device 110. In some embodiments, the positional relationship may include a distance and/or an angle between the user device 106 and the processing device 110.

In step 320, content is modified (e.g., scaled) based on the positional relationship determined in step 310. Step 320 may be performed in any of the ways described above, including resizing one or more elements of the content.

In step 330, the modified content is provided for presentation to a user. Step 330 may be performed in any of the ways described above, including the processing device 110 providing an output signal containing data representative of the modified content to one or more output devices (e.g., display 112), which can present the content for experiencing by the user.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system comprising:
a content processing subsystem including processor and memory hardware and configured to provide content for experiencing by a user; and
a user device communicatively coupled to said content processing subsystem;
wherein said content processing subsystem is configured to:
receive user input indicating a predefined distance threshold approximating a distance between said content processing subsystem and a specified location;
pause or resume playback of said content based on a positional relationship between said content processing subsystem and said user device, said pausing or resuming playback comprising:
pausing playback of said content when said positional relationship comprises a distance between said content processing subsystem and said user device that exceeds said predefined distance threshold, or
resuming playback of said content when said positional relationship comprises a distance between said content processing subsystem and said user device that does not exceed said predefined distance threshold.

2. The system of claim 1, wherein said positional relationship includes at least one of a distance relationship and an angular relationship between said content processing subsystem and said user device.

3. The system of claim 1, wherein said user device is physically portable in relation to said content processing subsystem.

4. The system of claim 1, wherein at least one of said content processing subsystem and said user device is configured to determine said positional relationship based on at least one communication signal transmitted between said user device and said content processing subsystem.

5. The system of claim 4, wherein said user device transmits said at least one communication signal to said content processing subsystem, said content processing subsystem configured to use at least one property of said communication signal to determine said positional relationship.

6. The system of claim 5, wherein said at least one property includes at least one of intensity, transmission delay, and angle of incidence of said communication signal.

7. The system of claim 1, wherein said user device includes at least one button configured to be actuated by the user, wherein an actuation of said button is configured to cause said content processing subsystem to perform at least one of activating a content modification mode, determining said positional relationship, and modifying said content based on said positional relationship.

8. The system of claim 7, wherein said modifying of said content based on said positional relationship takes into account an attribute of said content identified in metadata associated with said content.

9. The system of claim 1, wherein said content processing subsystem is further configured to:
provide configuration output for experiencing by the user,
receive feedback from the user, and
modify said predefined distance threshold based on said feedback.

10. An apparatus comprising:
at least one output driver configured to provide an output signal including content for experiencing by a user;
a communication interface configured to:
communicate with a user device, and
receive user input indicating a predefined distance threshold approximating a distance between said apparatus and a specified location; and
at least one hardware processor configured to pause or resume playback of said content based on a positional relationship between said apparatus and the user device,
wherein said pausing or resuming playback of said content based on said positional relationship comprises:
pausing playback of said content when said positional relationship comprises a distance between said apparatus and said user device that exceeds said predefined distance threshold, or resuming playback of said content when said positional relationship comprises a distance between said apparatus and said user device that does not exceed said predefined distance threshold.

11. The apparatus of claim 10, wherein said communication interface is configured to receive at least one communication signal from the user device, said at least one processor configured to use said at least one communication signal to determine said positional relationship.

12. The apparatus of claim 10, wherein said positional relationship includes at least one of a distance relationship and an angular relationship between said apparatus and the user device.

13. A method comprising:
receiving user input indicating a predefined distance threshold approximating a distance between a content processing subsystem and a specified location;
determining a positional relationship between said content processing subsystem and a user device, said positional relationship being determined by at least one of said content processing subsystem and said user device; and
pausing or resuming playback of content by said content processing subsystem based on said positional relationship,
wherein said pausing or resuming playback of said content based on said positional relationship comprises:
pausing playback of said content when said positional relationship comprises a distance between said content processing subsystem and said user device that exceeds said predefined distance threshold, or
resuming playback of said content when said positional relationship comprises a distance between said content processing subsystem and said user device that does not exceed said predefined distance threshold.

14. The method of claim 13, wherein said determining step includes determining at least one of a distance relationship and an angular relationship between said content processing subsystem and said user device.

15. The method of claim 13, further comprising transmitting at least one communication signal between said user device and said content processing subsystem, wherein said determining step includes using said at least one communication signal to determine said positional relationship.

16. The method of claim 13, wherein said content comprises media content.

17. The method of claim 16, wherein said media content comprises at least one of audio content and video content.

18. The method of claim 13, wherein:
said content processing subsystem is located in a room comprising a doorway; and
said predefined distance threshold approximates a distance between said content processing subsystem and said doorway.

19. A method comprising:
receiving user input indicating a predefined distance threshold approximating a distance between a content processing subsystem and a specified location;
playing back, by the content processing subsystem, a media program for experiencing by a user;
determining, by the content processing subsystem, a positional relationship between the content processing subsystem and a user device;
pausing, by the content processing subsystem, the playback of the media program when said positional relationship comprises a distance between said content processing subsystem and said user device that exceeds said predefined distance threshold;
determining, by the content processing subsystem, another positional relationship between the content processing subsystem and the user device; and
resuming, by the content processing subsystem, the playback of the media program when said another positional relationship comprises a distance between said content processing subsystem and said user device that does not exceed said predefined distance threshold.

20. The method of claim 19, wherein the media program comprises at least one of a television program, an on-demand program, a pay-per-view program, and a recorded broadcast media program.

21. The system of claim 9, wherein said configuration output comprises at least one of visual content and audio content.

22. The system of claim 21, wherein said configuration output comprises an eye exam chart.

23. The system of claim 21, wherein said feedback from the user indicates whether said visual content is viewable.

* * * * *